United States Patent
Löfholm (10) Patent No.: US 10,582,040 B2
(45) Date of Patent: Mar. 3, 2020

(54) METHOD, USER EQUIPMENT, COMPUTER PROGRAM AND COMPUTER PROGRAM PRODUCT FOR CONTROLLING A TOUCH SENSITIVE DISPLAY

(71) Applicant: Håkan Johan Löfholm, Huddinge (SE)

(72) Inventor: Håkan Johan Löfholm, Huddinge (SE)

( * ) Notice: Subject to any disclaimer, the term of this patent is extended or adjusted under 35 U.S.C. 154(b) by 0 days.

(21) Appl. No.: 16/314,218

(22) PCT Filed: Aug. 29, 2016

(86) PCT No.: PCT/SE2016/050808
§ 371 (c)(1),
(2) Date: Dec. 28, 2018

(87) PCT Pub. No.: WO2018/044210
PCT Pub. Date: Mar. 8, 2018

(65) Prior Publication Data
US 2019/0327360 A1 Oct. 24, 2019

(51) Int. Cl.
*H04M 1/725* (2006.01)
*G06F 3/0488* (2013.01)

(52) U.S. Cl.
CPC .... *H04M 1/72583* (2013.01); *G06F 3/04886* (2013.01)

(58) Field of Classification Search
CPC .............. H04M 1/72583; G06F 3/04886
USPC ........................................... 455/466
See application file for complete search history.

(56) References Cited

U.S. PATENT DOCUMENTS

| | | | | |
|---|---|---|---|---|
| 2005/0079896 A1* | 4/2005 | Kokko | ................ | G06F 3/0488 455/566 |
| 2009/0007017 A1* | 1/2009 | Anzures | ............. | G06F 3/04883 715/835 |
| 2009/0034514 A1 | 2/2009 | Hawkins et al. | | |
| 2010/0333043 A1* | 12/2010 | Faris | ................. | G06F 3/04883 715/863 |
| 2013/0260836 A1 | 10/2013 | Tsunoda et al. | | |
| 2015/0172452 A1 | 6/2015 | Kobayashi et al. | | |

FOREIGN PATENT DOCUMENTS

| | | |
|---|---|---|
| CN | 101442587 A | 5/2009 |
| CN | 101616389 A | 12/2009 |
| CN | 101808155 A | 8/2010 |

(Continued)

OTHER PUBLICATIONS

International Search Report and Written Opinion dated May 8, 2017 issued in corresponding PCT Application No. PCT/SE2016/050808 consisting of 12 pages.

(Continued)

*Primary Examiner* — Charles N Appiah
*Assistant Examiner* — Nicole M Louis-Fils
(74) *Attorney, Agent, or Firm* — Christopher & Weisberg, P.A.

(57) ABSTRACT

A method performed by a user equipment, the user equipment, and a computer program product. The method includes establishing a call connection with another user equipment and when the call is established, activating the touch sensitive display of the user equipment and activating and displaying only the end call key button of the touch sensitive display enabling the user of said user equipment to end or terminate the established call.

6 Claims, 5 Drawing Sheets

(56) References Cited

FOREIGN PATENT DOCUMENTS

| | | |
|---|---|---|
| CN | 104184881 A | 12/2014 |
| CN | 104391645 A | 3/2015 |
| EP | 2 602 979 A1 | 6/2013 |
| EP | 2 927 795 A1 | 7/2015 |

OTHER PUBLICATIONS

Extended European Search Report dated Dec. 9, 2019 issued in corresponding European Patent Application No. 16915331.9, consisting of 9 pages.

\* cited by examiner

METHOD, USER EQUIPMENT, COMPUTER PROGRAM AND COMPUTER PROGRAM PRODUCT FOR CONTROLLING A TOUCH SENSITIVE DISPLAY

CROSS-REFERENCE TO RELATED APPLICATIONS

This application is a Submission Under 35 U.S.C. § 371 for U.S. National Stage Patent Application of International Application Number: PCT/SE2016/050808, filed Aug. 29, 2016 entitled "A METHOD, A USER EQUIPMENT, A COMPUTER PROGRAM AND A COMPUTER PROGRAM PRODUCT FOR CONTROLLING A TOUCH SENSITIVE DISPLAY," the entirety of which is incorporated herein by reference.

TECHNICAL FIELD

The present invention generally relates to a method performed by a user equipment, a user equipment, a computer program, and a computer program product for controlling a touch sensitive display in a user equipment.

BACKGROUND

User equipment of today, such as e.g. mobile phones and/or other portable devices communicating to other user equipment, often include a touch sensitive display. Typically, so called smart phones includes touch sensitive displays. The touch sensitive displays are arranged for displaying e.g. key buttons, icons, pictures and/or information on the display. The touch sensitive displays are also arranged for receiving input from a user of the user equipment. The input can be in form of pressing/pushing/touching/tapping an area on the display corresponding to such key buttons, icons, pictures and/or information by use of one or more fingers and/or pointing devices. The key buttons being displayed on a touch sensitive display can be seen as virtual buttons.

The touch sensitive display registers one or more areas being pressed/pushed/touched/tapped on the touch sensitive display and provides this input/information to a processor included in the user equipment. The processor can interpret this input/information and can take appropriate actions in response to the input/information, e.g. activate a program and/or a function corresponding to a pressed icon.

For example, if the user of the user equipment wants to dial a phone number in order to establish a connection with another user equipment, the user presses key buttons of a keypad being displayed on the touch sensible display, wherein the combination of pressed key buttons corresponds to the telephone number of the other user equipment. The other user equipment mentioned in this document may generally include essentially any type of communication device, such as e.g. a portable/wireless telephone, a wired telephone and/or any other machine arranged for responding to calls.

The function of the user equipment is thus dependent on a well-functioning touch sensitive display, which registers when the user touches the display in order to convey input to the processor of user equipment. However, in some situations, the touch sensitivity of the display can cause problems. For example, when a user is using the user equipment, e.g. a smart phone, for talking to another user, the user usually holds the user equipment such that a loudspeaker of the user equipment is pressed against his/her ear and talks into a microphone of the user equipment. In other words, the user holds the user equipment against the side of his/her face when using the user equipment as a phone. Hereby, there is a risk that some part of the face and/or body of the user, or some other object, will come in contact with the touch sensitive display, which by the touch sensitive display and the processor in the user equipment will be interpreted as input of information.

Often, the user has used a keypad on the touch sensitive display when inputting the information needed to establish the call, e.g. the user has dialled a telephone number on the keypad or has searched for a contact/number in a list of contacts/numbers using the keypad. Therefore, the keypad is often displayed when the user is talking on the user equipment. When the user comes in contact with the display during the talk, e.g. by his/her ear, cheek and/or hair pressing against some key button of the keypad, a tone corresponding to that key button will be outputted by a loudspeaker of the other user equipment used by the other user during the talk. Thus, a loudspeaker of the other user equipment will, on top of the voice being outputted, also output one or more very annoying tones resulting from undesired input on the touch sensitive display. The user making the undesired input is normally unaware of that he/she is making the undesired input, and is thus also unaware of the stress and irritation this is causing to the other user during a talk.

Touch sensitive displays consume battery power when they emit light. Therefore, there have been developed prior art methods for completely deactivating the displays if a proximity detector, such as an infrared sensor built into the user equipment in order to determining distances from the user equipment to surrounding objects, indicates that the user equipment is held against the ear of the user. There have also been developed methods for determining if a user equipment is held closely to another object, such as an ear, where these methods include complex signal processing of audio signals being picked up by a microphone of the user equipment in order to determine the position of the user equipment in relation to other objects.

However, these prior art methods, that have been developed for power saving reasons and not for taking care of problems related to undesired input to touch sensitive displays, suffer from a number of disadvantages. The solutions using a proximity detector are costly to implement, since the user equipment obviously needs to include such a proximity detector. The solutions can also not be implemented at all in a large number of smart phones today, since many smart phones are not provided with a proximity detector. The known audio signal processing methods adds to the computational complexity of the user equipment, and also often do not work reliably. Further, the known prior art methods do not provide a function being adapted to the way a user of the user equipment normally handles the user equipment. For example, if a user of a user equipment holds e.g. a hand and/or a finger close to or on the proximity detector or the microphone when dialling a number or otherwise handling the user equipment, this would be interpreted as the user equipment being held against the ear, whereby the touch sensitive display would be completely inactivated. Thus, by simply holding the user equipment in an unfortunate grip, the touch sensitive display would be deactivated by these prior art methods, which would be very annoying. Also, the proximity sensor and/or the loudspeaker of smart phones of today are often designed and/or located such that the fingers of a user are likely to come close to and/or cover the proximity sensor and/or the loudspeaker when holding and/or handling the smart phone.

Most users are not aware of these functions of the smart phone, and do specifically not know where the proximity detector is located. Most users would therefore not understand that unintentional covering the proximity sensor or microphone completely inactivates the display. There is thus a risk that most users would cause the display to be turned into a completely black state without knowing the reason for it, which would of course be very annoying for the user.

There is therefore need for a method, a user equipment, a computer program and a computer program product comprising the computer program to provide a touch sensitive display control being well adapted to the way the user equipment is commonly used by their users today.

SUMMARY

The present invention provides a method, a user equipment, a computer program and a computer program product, such as a carrier, comprising the computer program for achieving the method of the invention.

According to an aspect of the present invention, there is provided a method performed in a user equipment comprising a touch sensitive display, the method comprising determining if a start call key button of the touch sensitive display is pressed by a user of the user equipment, and if that being the case: establishing a call connection with another user equipment; and activating the touch sensitive display, and displaying at least an end call key button of the touch sensitive display; the method further comprising determining if the established call is answered by the another user equipment, and that being the case, activating and displaying only the end call key button of the touch sensitive display enabling the user of the user equipment to end or terminate the established call.

According to another aspect of the present invention, there is provided a computer program, characterized in code means, which when run in a processor causes the processor to execute a method comprising determining if a start call key button of the touch sensitive display is pressed by a user of the user equipment, and if that being the case: establishing a call connection with another user equipment; and activating the touch sensitive display, and displaying at least an end call key button of the touch sensitive display; the method further comprising: determining if the established call is answered by the another user equipment, and that being the case, activating and displaying only the end call key button of the touch sensitive display enabling the user of the user equipment to end or terminate the established call.

According to yet another aspect of the present invention, there is provided a user equipment comprising a touch sensitive display, the user equipment further comprising a processor and a memory, the memory including instructions executable by the processor, whereby the user equipment is operative to determine if a start call key button of the touch sensitive display is pressed by a user of the user equipment, and that being the case: establish a call connection with another user equipment; and activate the touch sensitive display, and display at least an end call key button of the touch sensitive display; and the user equipment further being operative to determine if the call is answered by the another user equipment, and that being the case, activate and display only the end call key button of the touch sensitive display, enabling the user of the user equipment to end or terminate the established call.

According to yet another aspect of the present invention, there is provided a computer program product including a computer readable medium, such as e.g. a carrier, comprising the computer program described above, wherein the carrier is one of an electronic signal, optical signal, or a radio signal.

An advantage of the present invention is that the activation and display of only the end call key button during the talk or established connection efficiently reduces undesired inputs on the touch sensitive display generated by a user of the user equipment. The undesired inputs are usually performed when the display of the user equipment is put against the ear, but also when using a headset since the user may by accident touch by means of its hand or finger undesired key buttons of the touch sensitive display. According to embodiments herein, since the touch sensitive display is deactivated except for only the end call key button, the risk for a user to come in contact with an active part of the display during a call is efficiently reduced. The prior art problem of unintentionally pressing keypad key buttons e.g. with the cheek while making a telephone call is efficiently eliminated. At the same time, the only key button needed during the call, i.e. the end call key button, is active and displayed, such that the user quickly can end the call if he/she wants to. Also, a need to use a headset for the purpose to avoid pressing unintentionally a key button is also avoided.

The function or effect of the embodiments herein also eliminates the risk for unintentionally deactivating the display when holding and/or handling the user equipment when there is no established call connection. According to the present invention, the deactivation of the display except for the end call key button is only effected after a call connection has been established and the call has also been answered by the other user equipment being part of the established call connection. This completely eliminates the risk for the user of the user equipment to unintentionally deactivate the display simply by coming close to the proximity sensor and/or loudspeaker when holding and/or handling the user equipment during non-talk situations.

The embodiments of the present invention may be implemented in essentially any user equipment available today and including a touch sensitive display such as e.g. a smart phone, an Ipad etc. The present invention can be achieved without the need for expensive sensors, such as proximity sensors, and/or complex signal processing in the user equipment, which provides for a low cost and low complexity implementation of the present invention. Further the use of sensors reduces the battery life of the user equipment. This means that embodiments of the present invention save battery life of the user equipment even during an established call since the only activated button which is illuminated (displayed) is the end call button.

The embodiments of the present invention may provide a user of a user equipment with a downloadable application that can easily be installed and started in a user equipment of the user. The embodiments herein may also be implemented during the manufacturing of the device. Hereby, the function provided by the present invention can quickly and easily be implemented in a user equipment, enabling the user to automatically, without further involvement of the user, use the function.

Other advantages of the present embodiments are presented below, and will be clear for a reader of this document.

DETAILED DESCRIPTION

As mentioned above, the present invention provides a method, a user equipment, a computer program and a computer program product comprising the computer program for achieving the method of the invention.

Figure 1:
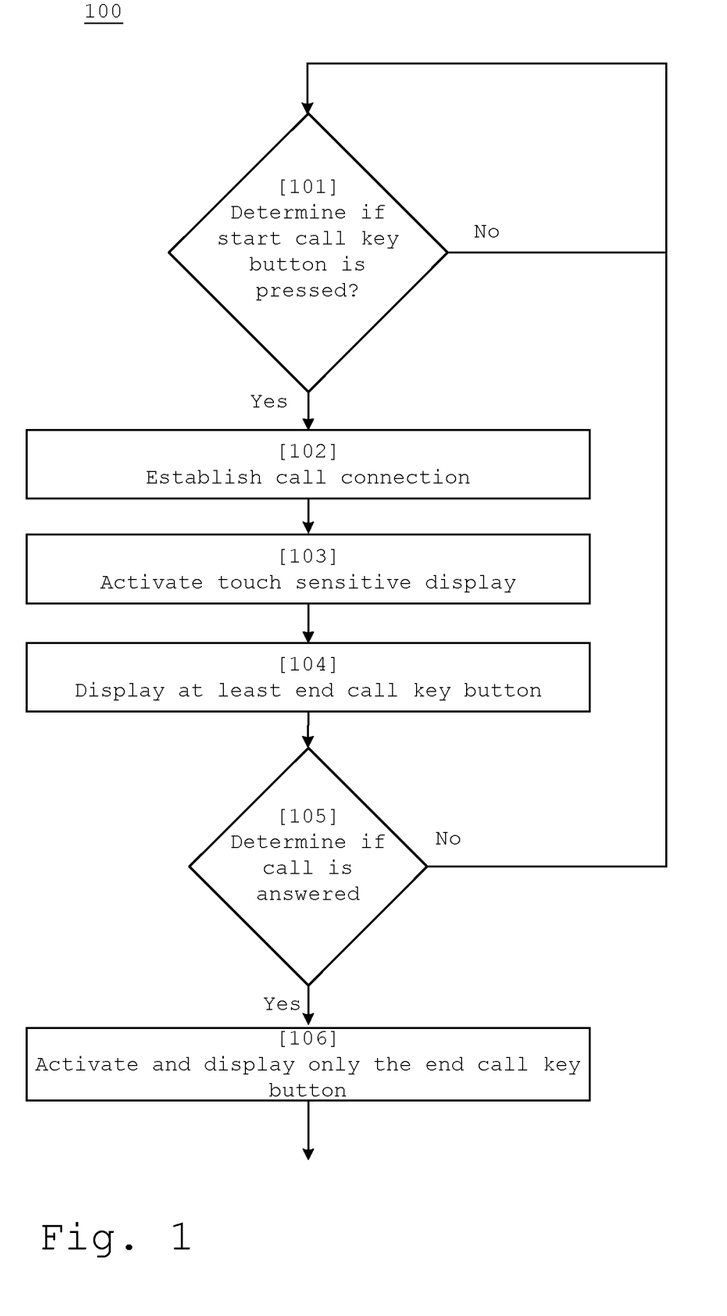
FIG. 1 is a flow diagram of exemplary embodiments of a method according to the present invention.

FIG. 1 is a flow chart diagram illustrating a method 100 according to the present invention, the method being performed in a user equipment comprising a touch sensitive display.

In a first step 101 of the method, it is determined if a start call key button of the touch sensitive display is pressed by a user of the user equipment. If that being the case, i.e. if the start call key button is pressed, a call connection with another user equipment is established in a second step 102 of the method, the touch sensitive display is activated in a third step 103 of the method, and at least an end call key button of the touch sensitive display is displayed in a fourth step 104 of the method. If the determination in the first step 101 concludes that the start call key button is not pressed, the method 100 starts from the beginning again.

In a fifth step 105 of the method, it is determined if the established call is answered by the another user equipment, and that being the case, i.e. if the call is answered, only the end call key button of the touch sensitive display is activated and displayed in a sixth step 106 of the method. Thus, if the established call has been answered, the only area being active and displaying information on the touch sensitive display is the end call key button, which enables the user of the user equipment to end the established call. At the same time, since the rest of the display is not active and is not displaying information, the risk for undesired input during the call is efficiently minimized. If the determination in the fifth step 105 concludes that the call has not been answered, the method 100 starts from the beginning again.

Figure 2:
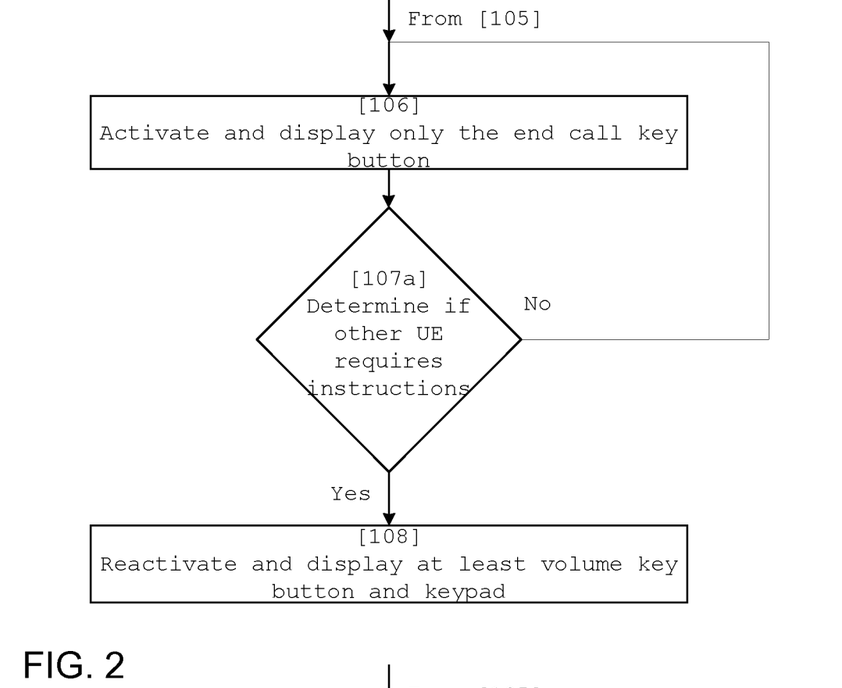
FIG. 2 is a flow diagram of an exemplary embodiment of a method according to the present invention.

FIG. 2 is a flow chart diagram illustrating an embodiment of the method 100 according to the present invention, the embodiment being performed in a user equipment comprising a touch sensitive display. In a seventh step 107a, being performed after the sixth step 106 of the method illustrated in FIG. 1, it is determined if the other user equipment requires the user of the user equipment according to the present invention to input at least one instruction on the touch sensitive display during the call; and that being the case, reactivating and displaying at least a volume key button and a keypad of the touch sensitive display in an eighth step 108. Hereby, the user of the user equipment according to the present invention is enabled to directly input the at least one instruction by usage of the reactivated and displayed key buttons of the touch sensitive display, also when the only the end call key button was active and displayed to start with after the sixth step 106.

More and more companies, such as banks or insurance companies, and also authorities, such as the police, hospitals, care centres, airports etc., often have an automatic voice answering machines arranged for receiving the call and for prompting the user of a user equipment to input information. Thus, the user can be asked to input instructions by usage of his/her smart phone, for example by pushing/pressing a key button on the keypad to select the appropriate action to be performed by the answering machine. The user then enters or pushes the one or more appropriate keys, waits for additional instructions, and hopefully gets the help he/she needs. For example, the mobile user is requested to push/enter key button "9" in case he wishes the instructions to be in another language, e.g. in Swedish. After that, the mobile user is requested to push/enter on an additional number, e.g. key button "1", to get in contact with a person. Also, sometimes the mobile user is requested to enter his or hers social security number (e.g. a Swedish personal number "personnummer") before he/she is instructed to push e.g. key button "1", as described above. By usage of the embodiment of the present invention shown in FIG. 2, the user can directly get access to the needed key buttons on the touch sensitive display, since they are automatically reactivated and displayed when there could be a use for the key buttons, i.e. when the user should enter input instructions/information.

The above described seventh step 107a for determining if the other user equipment requires instructions from the user of the user equipment according to the present invention includes, according to an embodiment of the present invention, a determination of if the other user equipment outputs a machine generated voice $V_{machine}$. If the other user equipment outputs a machine generated voice $V_{machine}$, this can be used as an indication for that instructions will have to be inputted by the user.

The determination of if the other user equipment outputs a machine generated voice $V_{machine}$ can include searching for a telephone number corresponding to the other user equipment in a database, wherein the database includes telephone numbers of user equipment outputting machine generated voices $V_{machine}$. If the telephone number of the other user equipment is found in the database when it is searched, it is determined that the other user equipment outputs a machine generated voice $V_{machine}$. According to an embodiment of the present invention, it is also determined that the other user equipment requires the user of the user equipment to input instructions if a machine generated voice $V_{machine}$ is output from the other user equipment.

The telephone number stored in the database may for example be a number to a bank, an authority, an insurance company, or any suitable party to which a user of the user equipment can call or dial to and where the dialled party requests by automatic voice or the like the dialler party, i.e. the user, to enter/activate/press/push a key button of a keypad or the like of the user equipment. For example, it can be assumed that a user wishes to call e.g. an insurance company for some reason. The mobile user then selects the telephone number of the insurance company from the user's contact list in his user equipment, or the user enters via the touch sensitive display or via voice commands the number or name of the insurance company. The user may also, if his/her user equipment is an advance smart phone, utter/speak up the name of the insurance company, whereby the user equipment itself dials/calls the insurance company. It is here assumed that the telephone number of the insurance company is comprised in a list or database or server and that the dialler party queries the database or server to check whether the number of the dialled party is comprised in that list. That being the case, i.e. if the telephone number is comprised in the list or database or server, the dialled party offers the dialler party with an automatic voice service enabling the dialled party to present options for the dialler party so that the dialler may press/push appropriate key button(s) depending on what the dialler party request as a particular service of the dialled party. Therefore, according to an embodiment of the present invention, at least the keypad of the user equipment of the dialler party is activated and displayed. Displaying the keypad enables the dialler party to input the information, as described above. Hence, since at least the keypad is automatically activated and displayed, it takes less time for the user to input the information, i.e. to make the selection of the key button to be pressed.

Figure 3:
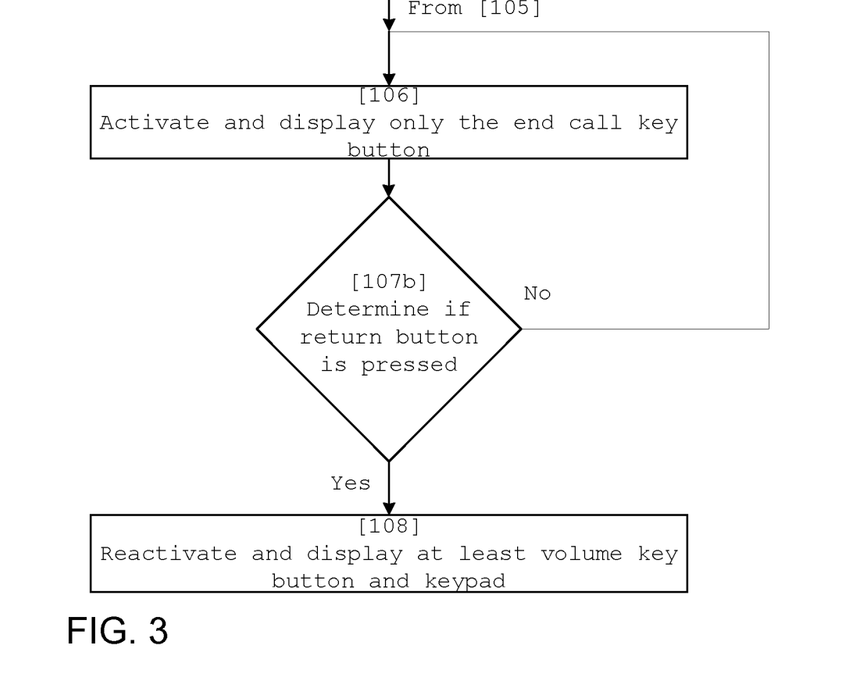
FIG. 3 is a flow diagram of an exemplary embodiment of a method according to the present invention.

FIG. 3 is a flow chart diagram illustrating an embodiment of the method 100 according to the present invention, the embodiment being performed in a user equipment comprising a touch sensitive display. In a seventh step 107b, being performed after the sixth step 106 of the method illustrated in FIG. 1, it is determined if the return button of the user equipment is pressed; and that being the case, reactivating and displaying at least a volume key button and a keypad of the touch sensitive display in an eighth step 108. Hereby, the user of the user equipment according to the present invention is enabled to directly use the user equipment in a normal way after the return button has been pressed, also when the only the end call key button was active and displayed to start with after the sixth step 106. Hereby, the user can directly get access to at least the keypad and the volume key button, which enables the user/dialler party to e.g. input information, access the internet, and/or start programs. Hence, since at least the keypad is activated and displayed directly when the return button is pressed on the user equipment, it takes less time for the user to be able to make use of the normal functions of the user equipment.

It should be noted that pressing the appropriate key button(s) of e.g. the keypad may be performed via voice, i.e. by voice commands, or via touch, i.e. by pressing/pushing the display, depending on the features supported by the user equipment, and possibly also selected by the user. Hence, the wording selecting the key button(s) of the keypad includes in this document pushing/pressing the appropriate key button(s), and also saying by usage of his voice the appropriate key button(s) of the keypad.

Figure 4:
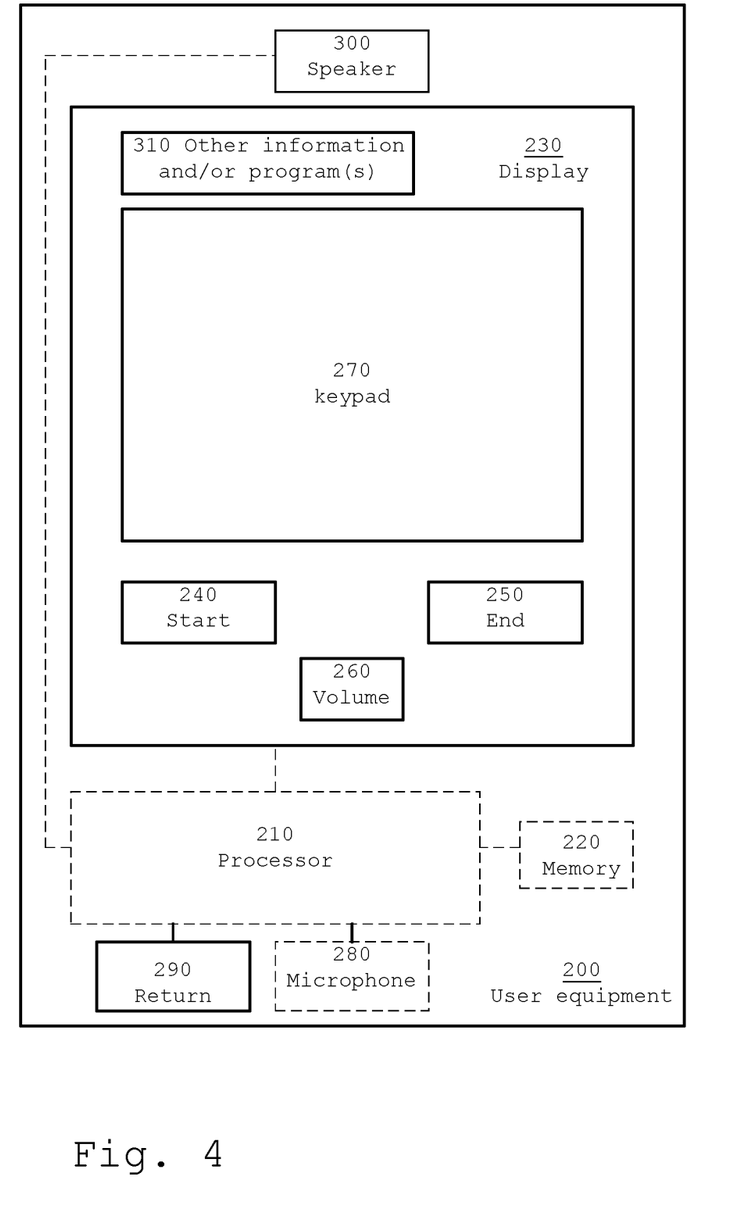
FIG. 4 is a block diagram of exemplary embodiments of a user equipment according to the present invention.

FIG. 4 schematically illustrates a block diagram illustrating a user equipment 200, in which the present invention and its embodiments can be implemented. As shown in FIG. 4, the user equipment 200 comprises a processor 210 and a memory 220. The user equipment 200 further comprises a touch sensitive display 230, which is usable for displaying e.g. the start call key button 240, the end call key button 250, the keypad 270, and the volume key button 260. The touch sensitive display 230 is also usable for displaying other information and/or other programs 310, such as icons being related to programs/applications, which is generally indicated in the figure. As is understood by a skilled person, the visual layout of what is shown on the display 230 may have essentially any form, and is not limited to the schematic illustration presented in FIG. 4. The user equipment may further include one or more of a microphone 280 picking up audio, such as e.g. speech, a speaker 300 outputting audio, e.g. speech or the like, and/or a return key button 290, being useful for returning to a view previously having been displayed by the display 230.

FIG. 4 is a non-limiting example schematically illustrating a possible design of the user equipment 200 in block diagram form. It is understood by a skilled person that the user equipment 200 may be designed in a large number of ways within the scope of the present invention. All the components of the user equipment 200 are connected directly or indirectly to the processor/processor module 210 as schematically shown in the figure.

The memory 220 comprises instructions executable by the processor 210 whereby the user equipment 200 is operative to determine 101 if a start call key button 240 of the touch sensitive display 230 is pressed by a user of the user equipment 200. If the start call key button 240 is pressed, then a call connection with another user equipment is established, the touch sensitive display 230 is activated 103, and at least an end call key button 250 of the touch sensitive display 230 is displayed 104. One non-limiting example of this situation is illustrated in FIG. 4, wherein the end call key button 250 and some more key buttons are displayed on the touch sensitive display 230.

Figure 5:
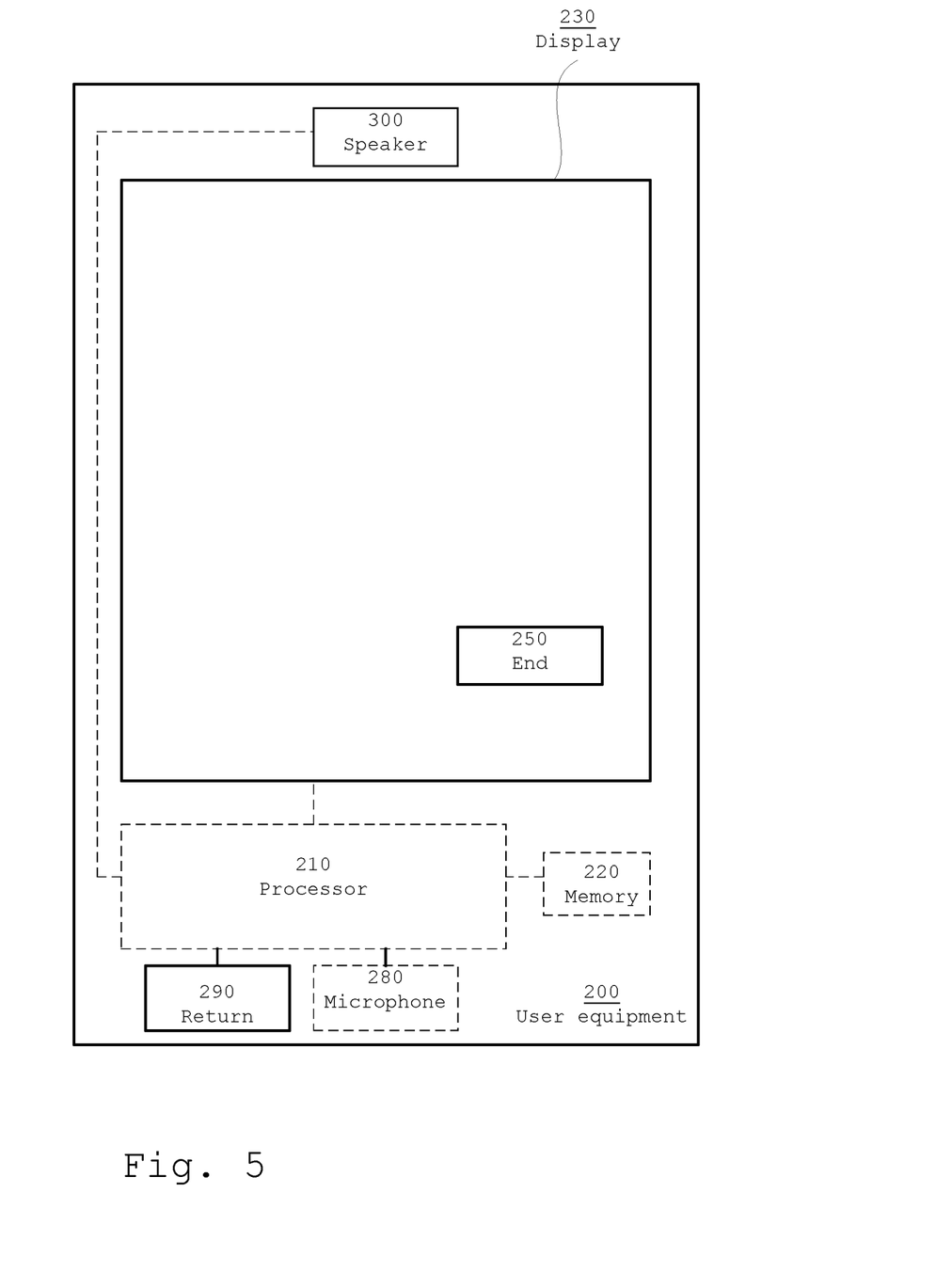
FIG. 5 is a block diagram of exemplary embodiments of a user equipment according to the present invention.

The user equipment 200 is further operative to determine 105 if the established call is answered by the another user equipment, and if the call has been answered activating and displaying 106 only the end call key button 250 of the touch sensitive display 230, thereby enabling the user of the user equipment 200 to end the established call. One non-limiting example of this situation is illustrated in FIG. 5, wherein only the end call key button 250 is active and displayed on the touch sensitive display 230. The rest of the touch sensitive display 230, i.e. the whole of the touch sensitive display 230 except for the end call key button 250 is here inactive during an established call being answered by the other user equipment, i.e. by a user of the other user equipment. Thus, when it is determined that the call has been established and also answered, what is displayed by the touch sensitive display 230 switches from e.g. what is shown in FIG. 4 to what is shown in FIG. 5.

As stated above, this has an advantage in that the risk for undesired inputs on the touch sensitive display generated by a user of the user equipment is minimized at the same time as power consumption is minimized. Also, the only key button needed during the call, i.e. the end call key button 250, is active and displayed, such that the user quickly can end or terminate the call if he/she wants to.

Figure 6:
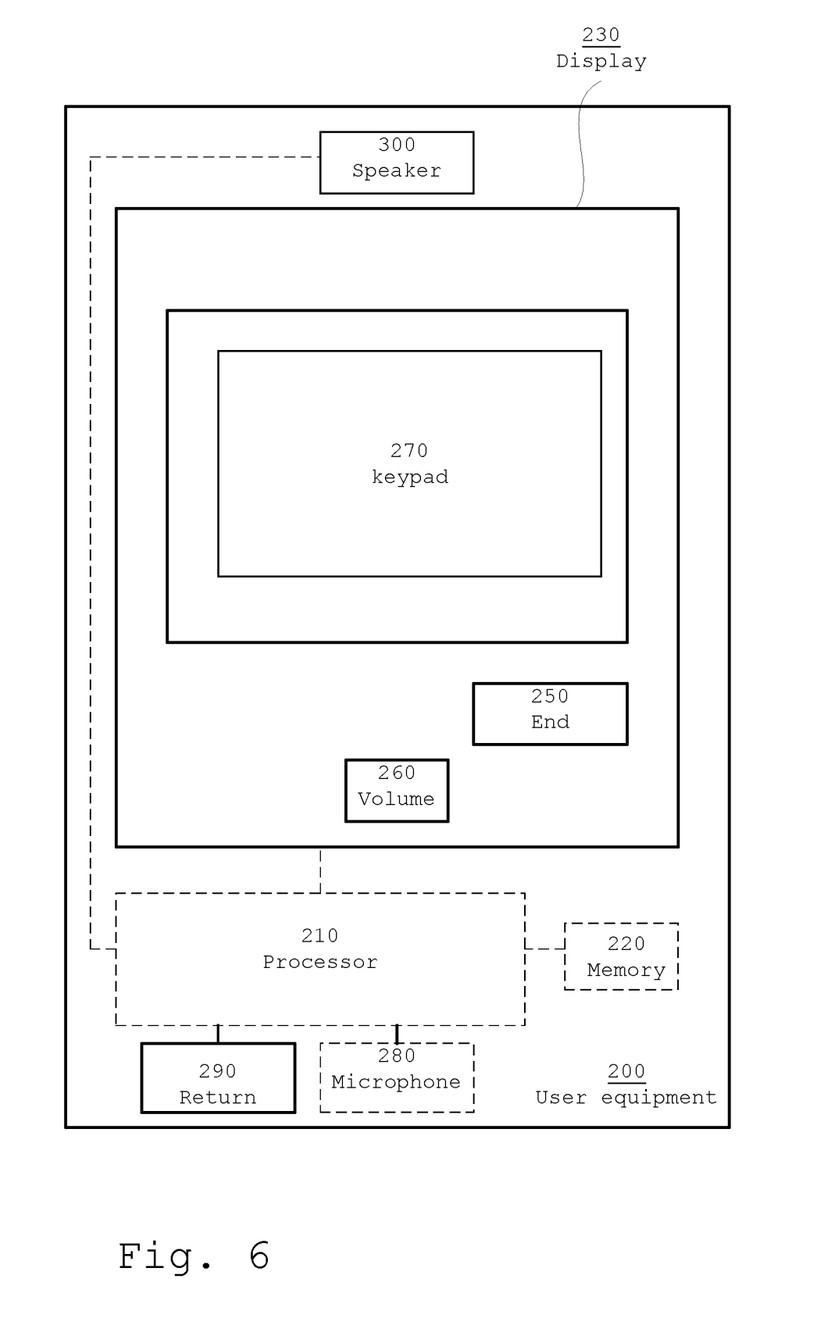
FIG. 6 is a block diagram of exemplary embodiments of a user equipment according to the present invention.

According to an embodiment of the present invention, the user equipment 200 is further configured to determine 107a if said another user equipment requires the user of the user equipment 200 to input at least one instruction on the touch sensitive display 230 during the call. If the user should input one or more instructions, the user equipment is configured to reactivate and display 108 at least a volume key button 260 and a keypad 270 of the touch sensitive display 230. Hereby, the the user of the user equipment 200 is enabled to perform/input the at least one instruction. One example of this situation is illustrated in FIG. 6, wherein the end call key button 250, the keypad 270 and the volume key button 260 are active and displayed on the touch sensitive display 230. Thus, when it is determined that the user needs to input instructions after a call has been established and answered, what is displayed by the touch sensitive display 230 switches from what is shown in FIG. 5 to what is shown in FIG. 6.

According to an embodiment of the present invention, the user equipment 200 is further configured to determine 107b if the return button 290 comprised in the user equipment 200 is pressed by the user of the user equipment 200 when only the end call key button 250 is active. If the return button 290 is pressed by the user of the user equipment 200, key buttons of the touch sensitive display 230, including at least a volume key button 260 and a keypad 270, are reactivated and displayed 108. One example of this situation is illustrated in FIG. 6, wherein the end call key button 250, the keypad 270 and the volume key button 260 are active and displayed on the touch sensitive display 230. Thus, when it is determined that the user has pressed the return button 290 after a call has been established and answered, what is displayed by the touch sensitive display 230 switches from what is shown in FIG. 5 to what is shown in FIG. 6.

The features commonly being illustrated in FIGS. 4-6 and having the same reference numerals are described above in connection with FIG. 4.

According to an embodiment of the present invention, the user equipment is configured to display the end call key button 250 as far away from the speaker 300 as possible on the display 230. Thus, the end call key button 250 is displayed at a first end, i.e. a bottom end when the user equipment 200 is held in its normal position, of the touch sensitive display 230, where the first end is opposite to a second end, i.e. a top end, of the touch sensitive display being located at a loudspeaker 300 of the user equipment 200. In other words, the end call key button 250 is displayed at the end of the touch sensitive display 230 being closest to the microphone 280. This position for the end call key button minimizes the risk for unintentionally ending the call by pressing the end call key button 250 with e.g. the cheek of the user.

According to yet another aspect of the present invention, a computer program is provided, the computer program comprising instructions which, when executed on at least one processor e.g. processor 210, cause the at least one processor 210 to carry out the method according to any one of the in this document described methods and/or embodiments of the present invention.

According to yet another aspect, a carrier comprising the computer program mentioned above is provided, wherein the carrier is one of an electronic signal, optical signal, radio signal, or computer readable storage medium.

In more detail, the embodiments herein may be implemented through one or more processors or processing units e.g. processing circuits or units, e.g. the processors 210 in FIGS. 4-6, of a user equipment 200, such as e.g. a smart phone together with a computer program code for performing the functions and/or method steps of the embodiments. For example, a computer program comprising instructions which, when executed on at least one processor, cause the at least one processor to carry out the method performed by the user equipment as described in this document.

It should be noted that the embodiments herein may be applicable is essentially any communication system, such as e.g. a second generation (2G); a third generation (3G), a fourth generation (4G or LTE (Long Term Evolution)) system; Wifi or WLAN (Wireless Local Area Network); WiMax, CDMA 2000 etc. Hence the solution presented herein is not restricted to any particular communication system.

It should be mention that the above described different components of the user equipment 200 may be modules e.g. a keypad module 270; a speaker module 300; a processor module 210; a memory module 220; a display module 230. Other components modules are also present but not shown. For example, an antenna, a receiver/transmitter/transceiver etc. Hence the user equipment 200 is not restricted to only the components shown in the figures.

Also, the user equipment 200 may further comprise:

A first determination module, configured to determine 101 if a start call key button 240 of the touch sensitive display 230 is pressed by a user of the user equipment 200, and if that is the case: an establishing module is configured to establish 102 a call connection with another user equipment; and an activation module is configured to activate 103 the touch sensitive display 230, and display 104 at least an end call key button 250 of the touch sensitive display 230; and a determination module is configured to determine 105 if the established call is answered by said another user equipment, and if that is the case: an activation and display module is configured to activate and display 106 only the end call key button 250 of the touch sensitive display 230, enabling the user of the user equipment 200 to end or terminate the established call.

According to an embodiment, the user equipment 200 may further comprise: a second determination module, configured to determine 107*a* if the another user equipment requires the user of the user equipment 200 to input at least one instruction on said touch sensitive display 230 during the call; and if that is the case, a first reactivation and display module is configured to reactivate and display 108 at least a volume key button 260 and a keypad 270 of the touch sensitive display 230, enabling the user of the user equipment 200 to perform the at least one instruction.

According to an embodiment, the user equipment 200 may further comprise: a third determination module, configured to determine 107*b* if a return button 290 comprised in the user equipment 200 is pressed by the user of the user equipment 200 when only the end call key button 250 is active; and if the return button 290 is pressed by the user of the user equipment 200; and if that is the case, a second reactivation and display module is configured to reactivate and display 108 key buttons of the touch sensitive display 230, the key buttons including at least a volume key button 260 and a keypad 270.

The first, second and third determination modules described above may be implemented in a common determination module, or may be implemented in first, second and third separate determination modules. The first and second reactivation and display modules described above may be implemented in a common reactivation and display module, or may be implemented in first and second separate reactivation and display modules.

The foregoing description of the exemplary embodiment of the present invention has been presented only for the purpose of illustration, and the description is not intended to limit the invention in the form described. Alternative modifications will become apparent to those skilled in the art, to which the present invention pertains without departing from its spirit and scope, the Scope of the present invention is defined by the appended claims rather than the foregoing description and exemplary embodiments described therein.

The invention claimed is:

1. A method performed in a user equipment comprising a touch sensitive display, the method comprising:
   determining if a start call key button on the touch sensitive display has been pressed by a user of the user equipment, and when it is determined that the start call key button has been pressed:
   establishing a call connection with another user equipment;
   activating the touch sensitive display; and
   displaying at least an end call key button on the touch sensitive display; and
   determining if the established call has been answered by the other user equipment, and if it has been determined that the established call has been answered by the other user equipment:
   activating and displaying only the end call key button on the touch sensitive display enabling the user of the user equipment to terminate the established call; and determining if the other user equipment requires the user of the user equipment to input at least one instruction on said touch sensitive display during the call, and if it has been determined that the other user equipment requires the user of the user equipment to input at least one instruction on the touch sensitive display:
  activating and displaying at least a volume key button and a keypad of the touch sensitive display, enabling the user of the user equipment to input the at least one instruction.

2. The method according to claim 1, further comprising:
determining if a return key button comprised in the user equipment is pressed by the user of the user equipment, and if the return key button has been pressed:
  reactivating and displaying key buttons of the touch sensitive display, the key buttons including at least a volume key button and a keypad.

3. A non-transitory computer storage medium storing a computer program, which when run in a processor causes the processor to:
  determine if a start call key button on the touch sensitive display has been pressed by a user of the user equipment, and when it is determined that the start call key button has been pressed:
  establish a call connection with another user equipment;
  activate the touch sensitive display; and
  display at least an end call key button on the touch sensitive display;
  determine if the established call has been answered by the other user equipment, and if it has been determined that the established call has been answered by the other user equipment:
    activate and display only the end call key button on the touch sensitive display, enabling the user of the user equipment to terminate the established call; and
  determine if the other user equipment requires the user of the user equipment to input at least one instruction on said touch sensitive display during the call, and if it has been determined that the other user equipment requires the user of the user equipment to input at least one instruction on the touch sensitive display:
    activate and display at least a volume key button and a keypad of the touch sensitive display, enabling the user of the user equipment to input the at least one instruction.

4. The non-transitory computer storage medium according to claim 3, wherein the computer program, when run, further causes the processor to:
  determine if a return key button comprised in the user equipment is pressed by the user of the user equipment, and if the return key button has been pressed:
    reactivate and display key buttons of the touch sensitive display, the key buttons including at least a volume key button and a keypad.

5. A user equipment comprising a touch sensitive display, a processor and a memory, the memory including instructions executable by the processor to configure the user equipment to:
  determine if a start call key button on the touch sensitive display has been pressed by a user of the user equipment, and when it is determined that the start call key button has been pressed:
    establish a call connection with another user equipment;
  activate the touch sensitive display; and
  display at least an end call key button on the touch sensitive display;
  determine if the established call has been answered by the other user equipment, and if it has been determined that the established call has been answered by the other user equipment:
    activate and display only the end call key button on the touch sensitive display, enabling the user of the user equipment to end the established call; and
  determine if the other user equipment requires the user of the user equipment to input at least an instruction on the touch sensitive display during the call, and if it has been determined that the other user equipment requires the user of the user equipment to input at least one instruction on the touch sensitive display:
    activate and display at least a volume key button and a keypad of the touch sensitive display, enabling the user of the user equipment to input the at least one instruction.

6. The user equipment according to claim 5, wherein the instructions executable by the processor further configure the user equipment to:
  determine if a return key button comprised in the user equipment is pressed by the user of the user equipment, and if the return key button has been pressed:
    reactivate and display key buttons of the touch sensitive display, the key buttons including at least a volume key button and a keypad.

* * * * *